(12) United States Patent
Zhang et al.

(10) Patent No.: US 12,179,461 B2
(45) Date of Patent: Dec. 31, 2024

(54) COMPOSITE PANE COMPRISING ELECTRICALLY CONTROLLABLE OPTICAL PROPERTIES AND CONTROL UNIT

(71) Applicant: SAINT-GOBAIN GLASS FRANCE, Courbevoie (FR)

(72) Inventors: Huixing Zhang, Aachen (DE); Karl Malachowski, Aachen (DE); Adil Jaafar, Margny-les-Compiegne (FR); Xavier Drouet, Marly la Ville (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/262,312

(22) PCT Filed: Jan. 11, 2022

(86) PCT No.: PCT/EP2022/050412
§ 371 (c)(1),
(2) Date: Jul. 20, 2023

(87) PCT Pub. No.: WO2022/157035
PCT Pub. Date: Jul. 28, 2022

(65) Prior Publication Data
US 2024/0066840 A1    Feb. 29, 2024

(30) Foreign Application Priority Data
Jan. 20, 2021    (DE) .................. 10 2021 101 109.4

(51) Int. Cl.
*B32B 17/10*    (2006.01)
*B32B 3/08*    (2006.01)
(Continued)

(52) U.S. Cl.
CPC ........ *B32B 17/10504* (2013.01); *B32B 3/085* (2013.01); *B32B 17/10036* (2013.01);
(Continued)

(58) Field of Classification Search
CPC ........ B32B 17/10504; B32B 17/10036; B32B 17/10513; B32B 17/10532;
(Continued)

(56) References Cited

U.S. PATENT DOCUMENTS 5,624,591 A * 4/1997 Di Trapani ....... B32B 17/10174
219/203
2010/0259704 A1* 10/2010 Fu ..................... G02F 1/133608
362/97.1
(Continued)

FOREIGN PATENT DOCUMENTS

DE         100 43 141 A1     3/2002
DE     10 2005 007427 A1     8/2006
(Continued)

OTHER PUBLICATIONS

International Search Report as issued in International Patent Application No. PCT/EP2022/050412, dated Apr. 19, 2022.

*Primary Examiner* — Dung T Nguyen
*Assistant Examiner* — David Y Chung
(74) *Attorney, Agent, or Firm* — Pillsbury Winthrop Shaw Pittman LLP (57) ABSTRACT

A composite pane with electrically controllable optical properties, includes an outer pane and an inner pane joined to one another via a thermoplastic intermediate layer, wherein a functional element with electrically controllable optical properties is integrated into the intermediate layer, wherein a securing element for reversibly securing a control unit is attached to a surface of the outer pane or of the inner pane facing away from the intermediate layer, and wherein a (Continued)

control unit suitable for controlling the optical properties of the functional element is arranged in the securing element.

19 Claims, 3 Drawing Sheets (51) Int. Cl.
*B60J 3/04* (2006.01)
*E06B 3/67* (2006.01)
*E06B 9/24* (2006.01)
*G02F 1/1334* (2006.01)
*G02F 1/1335* (2006.01)
*G02F 1/1345* (2006.01)
*G02F 1/157* (2006.01)
*G02F 1/1677* (2019.01)

(52) U.S. Cl.
CPC .. *B32B 17/10513* (2013.01); *B32B 17/10532* (2013.01); *B32B 17/10761* (2013.01); *B32B 17/10807* (2013.01); *B60J 3/04* (2013.01); *E06B 3/6722* (2013.01); *E06B 9/24* (2013.01); *G02F 1/1334* (2013.01); *G02F 1/133512* (2013.01); *G02F 1/13452* (2013.01); *G02F 1/157* (2013.01); *G02F 1/1677* (2019.01); *B32B 2419/00* (2013.01); *B32B 2605/00* (2013.01); *E06B 2009/2464* (2013.01)

(58) Field of Classification Search
CPC ......... B32B 17/10761; B32B 17/10807; G02F 1/1677; G02F 1/1334; G02F 1/133512; G02F 1/13452; G02F 1/157
See application file for complete search history.

(56) References Cited

U.S. PATENT DOCUMENTS

| 2012/0026573 | A1 | 2/2012 | Collins et al. | |
| 2021/0008843 | A1* | 1/2021 | Klein | B32B 17/10871 |

FOREIGN PATENT DOCUMENTS

| DE | 10 2005 049081 B3 | 6/2007 |
| DE | 10 2007 027296 A1 | 12/2008 |
| DE | 10 2008 026339 A1 | 12/2009 |
| DE | 10 2009 033054 A1 | 2/2010 |
| DE | 10 2013 001334 A1 | 7/2014 |
| EP | 0 876 608 B1 | 4/2002 |
| EP | 1 862 849 A1 | 12/2007 |
| EP | 2 500 769 A2 | 9/2012 |
| EP | 3 456 913 A1 | 3/2019 |
| WO | WO 2010/147494 A1 | 12/2010 |
| WO | WO 2011/033313 A1 | 3/2011 |
| WO | WO 2011/161039 A1 | 12/2011 |
| WO | WO 2012/007334 A1 | 1/2012 |
| WO | WO 2018/188844 A1 | 10/2018 |
| WO | WO 2019/068419 A1 | 4/2019 |

* cited by examiner

COMPOSITE PANE COMPRISING ELECTRICALLY CONTROLLABLE OPTICAL PROPERTIES AND CONTROL UNIT

CROSS-REFERENCE TO RELATED APPLICATIONS

This application is the U.S. National Stage of PCT/EP2022/050412, filed Jan. 11, 2022, which in turn claims priority to German patent application number 10 2021 101109.4 filed Jan. 20, 2021. The content of these applications are incorporated herein by reference in their entireties.

The invention relates to a composite pane with electrically controllable optical properties, a method for its production, and its use.

Composite panes with electrically controllable optical properties are known per se. They are provided with functional elements whose optical properties can be changed by an applied electrical voltage. SPD functional elements (suspended particle device), known, for example, from EP 0876608 B1 and WO 2011033313 A1, are one example of such functional elements. The transmittance of visible light through SPD functional elements can be controlled by the applied voltage. PDLC functional elements (polymer dispersed liquid crystal), known, for example, from DE 102008026339 A1, are another example. The active layer contains liquid crystals that are incorporated into a polymer matrix. When no voltage is applied, the liquid crystals are oriented in a disorderly manner, resulting in strong scattering of the light passing through the active layer. When a voltage is applied to the flat electrodes, the liquid crystals align themselves in a common direction and the transmittance of light through the active layer is increased. The PDLC functional element acts less by reducing total transmittance than by increasing scattering, thus preventing free through-vision or making it possible to ensure protection against glare. In addition, electrochromic functional elements are known, for example, from US 20120026573 A1, WO 2010147494 A1 and EP 1862849 A1 and WO 2012007334 A1, in which a change in transmittance occurs as a result of electrochemical processes induced by the applied electrical voltage.

Numerous possible applications for such composite panes are known, wherein in particular the possibility of seeing through the composite pane is influenced. Thus, for example, in the construction and architecture sector, window panes of the outer façade or partitions in the interior can be realized with such composite panes, which can be switched from a transparent state that allows through-vision to a non-transparent state to protect the interior of the building or room against unwanted viewing from the outside (privacy function). Likewise, window panes can be switched to a darkened state to avoid disruptive solar radiation.

Composite panes with electrically controllable functional elements have also been proposed for the vehicle sector. These are of interest in particular as roof panels to reduce solar radiation or diminish distracting reflections. Such roof panels are known, for example, from DE 10043141 A1 and EP 3456913 A1. Windshields have also been proposed in which an electrically controllable sun visor is implemented using such a functional element to replace prior art mechanically flippable sun visors in motor vehicles. Windshields with electrically controllable sun visors are known, for example, from DE 102013001334 A1, DE 102005049081 B3, DE 102005007427 A1, and DE 102007027296 A1.

In order to be able to operate the composite panes with electrically controllable functional elements as intended, a control unit is required that, depending on a switching state, applies the required voltage to the electrodes of the functional element in order to control the optical properties and to set them as desired by the operator. In vehicles, these control units are typically bolted or glued in region of the vehicle body. This has the disadvantage that the electrical connection of the composite panes, for which, in particular, very long electrical cables are necessary, is made more difficult.

DE 102009033054 A1, WO 2011161039 A1, and EP 2500769 A2 disclose composite panes with electrically controllable optical properties, wherein electrical contact means are sometimes reversibly secured to the composite pane for the electrical contacting of the controllable functional element. The contact means can have an integrated control unit.

The object of the present invention is to provide an improved composite pane having electrically controllable optical properties that enables a simpler electrical connection.

The object of the present invention is accomplished by a composite pane with electrically controllable optical properties in accordance with the independent claim 1. Preferred embodiments are apparent from the dependent claims.

The composite pane according to the invention comprises at least an outer pane and an inner pane joined to one another via an intermediate layer. The composite pane is provided, in a window opening, for example, of a vehicle, a building, or a room, to separate the interior from the external surroundings. In the context of the invention, "inner pane" refers to the pane facing the interior. "Outer pane" refers to the pane facing the external surroundings. The outer pane and the inner pane have, in each case, an exterior-side and an interior-side surface and a circumferential side edge running therebetween. In the context of the invention, "exterior-side surface" refers to that primary surface intended to face the external surroundings in the installed position. In the context of the invention, "interior-side surface" refers to that primary surface intended to face the interior in the installed position. The interior-side surface of the outer pane and the exterior-side surface of the inner pane face each other and are joined to one another by the thermoplastic intermediate layer.

The composite pane according to the invention contains a functional element with electrically controllable optical properties that is integrated into the intermediate layer. The functional element is preferably arranged between at least two layers of thermoplastic material of the intermediate layer, whereby it is joined to the outer pane by the first layer and to the inner pane by the second layer. Preferably, the side edge of the functional element is completely surrounded by the intermediate layer such that the functional element does not extend all the way to the side edge of the composite pane and thus has no contact with the surrounding atmosphere.

According to the invention, a securing element for reversibly securing a control unit is mounted on a surface of the outer pane or of the inner pane facing away from the intermediate layer, i.e., on the exterior-side surface of the outer pane or on the interior-side surface of the inner pane. An electrical or electronic control unit suitable for controlling the optical properties of the functional element is arranged in the securing element. As a result of the mounting of the control unit directly on the composite pane, the electrical connection thereof is facilitated. In particular, no long cables are required between the control unit and the functional element. In addition, since the control unit is provided together with the composite pane as a compact component, validation, for example, on the part of the vehicle manufacturer or tests for legal approval are facilitated. Because of the fact that the control unit is not secured directly on the composite pane but is, instead, reversibly accommodated in the securing element and can be removed relatively simply, maintenance, repair, or replacement of the control element is significantly simplified. These are major advantages of the present invention.

In a preferred embodiment, the securing element is attached to the interior-side surface of the inner pane. The control unit is then protected, in the interior of the building, room, or vehicle, against interference or manipulation from the outside, and does not adversely affect the external appearance of the composite pane.

The securing element is provided for and suitable for the reversible securing of a control unit. The term "reversible securing" means detachable connection, in particular nondestructive detachable connection. The control unit can therefore be attached to the securing element and removed from it again without damaging or destroying the securing element, the composite pane, or the connection between the two. The reversible connection of the control unit and the securing element is in particular designed such that the control unit can be inserted into the securing element or plugged onto the securing element and snapped or clipped in there such that complex assembly steps, such as bolting can be dispensed with. The securing element preferably comprises at least one plate that is connected to the pane surface over its entire surface. The plate is preferably provided with latching means that interact with complementary parts of the control unit in a force-fitting or form-fitting manner thereby fix the control unit on the securing element. The latching means can, for example, be in the form of a circumferential or interrupted side wall that is arranged in the edge region of the plate. The side wall and the plate form a cavity that has an opening facing away from the composite pane and delimited by the side wall. The control unit can be inserted into this cavity. However, it is also possible for the latching means to be arranged in the central region of the plate, for example, in the form of an elevation that is inserted into a complementary depression on the underside of the control unit facing the composite pane. The securing element is preferably a one-piece component that can also be referred to as a carrier or holder for the control unit.

The securing element is fixedly connected to the composite pane, i.e., is not nondestructively detachable. In a preferred embodiment, the securing element is attached to the surface of the outer pane or inner pane via a layer of an adhesive, which pane is typically made of glass or plastic. The adhesive connection makes it possible to dispense with holes, bolts, and similar securing means, which are comparatively difficult to realize. However, in principle, other types of securing are also conceivable. Thus, for example, a screw or a securing bolt can be passed through a hole in the pane in order to secure the securing element thereon.

The securing element is preferably made of plastic. Polyamides are particularly suitable. Alternatively, the securing element is preferably made of a metal or a metal alloy, for example, of aluminum or an aluminum alloy (whereby the securing element has an advantageously low weight) or of steel, in particular of stainless-steel (whereby the securing element is advantageously economical, stable, and corrosion resistant). Alternatively, the securing element can also be made, for example, of ceramic. Combinations of the materials mentioned are also conceivable. For example, the securing element can be made of plastic and include a metal insert that improves stability and mechanical resistance or provides a spring effect for reversibly securing the control unit.

The control unit is provided for and suitable for controlling the optical properties of the functional element. The control unit is electrically conductively connected to the flat electrodes of the functional element and includes the necessary electrical and/or electronic components to apply the required voltage to the flat electrodes as a function of a switching state. The switching state can be specified by the user, for example, by operating a switch, a button, or to a rotary or slide control, or can be determined by sensors. The switches, buttons, rotary or slide controls can, for example, be integrated into the dashboard of the vehicle when the composite pane is a vehicle pane. However, touch switch surfaces can also be integrated directly into the composite pane, for example, capacitive or resistive switch surfaces. Alternatively, the functional element can also be controlled by contact-free methods, for example, by gesture recognition, or as a function of the state of the pupil or eyelid detected by a camera and suitable evaluation electronics. The control unit can include, for example, voltage converters, transistors, and other components. The control unit is preferably connected to the onboard electrical system of the vehicle, from which it, in turn, obtains the electrical voltage and, optionally, the information concerning the switching state.

The electrical connection of the control unit to the flat electrodes of the functional element can be designed in various ways. In one embodiment, electrical cables that lead to the functional element are connected directly to the control unit. In another embodiment, the electrical cables are connected directly to the securing element and electrically conductively connected to a contact region of the securing element. The control unit has a complementary contact region that is brought into contact with the contact region of the securing element when the control unit is attached to the securing element as intended. The two complementary contact regions can be implemented, for example, as simple contact surfaces that are brought into contact with each other over the entire surface. The complementary contact regions can, however, also be implemented as pins and complementary receptacles that interact with each other according to the "plug-socket" principle.

The cable connection between the control unit or securing element and the functional element can be replaced in sections by conductive structures on the pane surface, for example, by printed and baked conductors made of a silver-containing printing paste.

The securing element, in particular the plate can be provided with electrical conductor tracks. These conductor tracks can serve to electrically conductively connect a contact region of the securing elements to the attached cables. The conductor tracks can also serve to interconnect multiple control units to one another, in series, for example. Multiple control units are necessary, for example, when the functional element is divided into multiple segments intended to be controlled independently of one another.

The control unit should have the smallest possible dimensions such that it can be mounted to inconspicuously on the composite pane. In particular, the control unit should be formed as flat as possible. In a preferred embodiment, the control unit has a thickness of 5 cm, particularly preferably at most 3 cm. The thickness is the dimension that rises from the composite pane. The length of the control unit is preferably at most 20 cm, particularly preferably at most 15 cm, and its width is preferably at most 15 cm, particularly preferably at most 10 cm.

The composite pane according to the invention can be provided with an opaque masking print, in particular in a circumferential edge region. Such a masking print is common in the automotive sector. It is typically formed from an enamel containing glass frits and a pigment in particular black pigment. The printing ink is typically applied by screen printing and baked. Such a masking print is applied to at least one of the pane surfaces, preferably the interior-side surface of the outer pane and/or of the inner pane.

A particular advantage of the invention is the flexibility in terms of positioning of the securing element and the control unit, for which essentially its entire pane surface is available. In an advantageous embodiment, the securing element is arranged in the circumferential edge region with the opaque masking print. There, the control unit is visually inconspicuous and, in particular, does not interfere with the vision through the transparent region of the composite pane. In addition, attachment in the edge region enables the use of shorter cables for the connection to the flat electrodes of the functional element.

In an advantageous embodiment, the securing element is equipped with at least one sensor. The sensor can be, for example, a light sensor or a temperature sensor. The sensor is connected to the control unit and the control unit is suitable for reading the sensor and performing an action depending on the signal measured by the sensor. In a particularly advantageous embodiment, the sensor is a light sensor, and the optical properties of the functional element are automatically adjusted by the control unit as a function of the measured light incidence. Thus, the functional element can be switched from a transparent into a non-transparent state when the measured light incidence exceeds a specified threshold value. It is also possible for the transparency of the functional element to be adjusted continuously as a function of the light incidence measured, with higher light incidence resulting in lower transparency. Position-resolved and/or direction-dependent light sensors can determine the direction of incidence or the position of the sun. If the functional element is divided into independently controllable segments, it is possible, for example, for only one incidence-direction or sun-position dependent part of the functional element to be set as a non-transparent anti-glare screen, while the rest of the functional element remains transparent. A temperature sensor can, for example, be used to alert the user to slowed control behavior due to low temperatures.

The functional element comprises at least one active layer and two flat electrodes arranged on both sides of the active layer. The active layer has the variable optical properties that can be controlled by an electrical voltage applied to the active layer via the flat electrodes. In the context of the invention, "electrically controllable optical properties" means those properties that are continuously controllable, but equally also those that can be switched between two or more discrete states. Said optical properties relate in particular to light transmittance and/or scattering behavior. The flat electrodes preferably contain at least one metal, a metal alloy, or a transparent conducting oxide (TCO). The flat electrodes can, for example, be based on silver, gold, copper, nickel, chromium, tungsten, indium tin oxide (ITO), gallium-doped or aluminum-doped zinc oxide, and/or fluorine-doped or antimony-doped tin oxide, preferably based on silver or ITO. The flat electrodes preferably have a thickness from 10 nm to 2 μm, particularly preferably from 20 nm to 1 μm, most particularly preferably from 30 nm to 500 nm. The functional element also preferably includes two carrier films, with the active layer and the flat electrodes preferably arranged between the carrier films. The carrier films are preferably formed from a thermoplastic material, for example, based on polyethylene terephthalate (PET), polypropylene, polyvinyl chloride, fluorinated ethylene-propylenes, polyvinyl fluoride, or ethylene tetrafluoroethylene, particularly preferably based on PET. The thickness of the carrier films is preferably from 10 μm to 200 μm. The flat electrodes are preferably designed as transparent, electrically conductive layers. The flat electrodes, the carrier films, and the active layer are typically arranged substantially parallel to the surfaces of the outer pane and of the inner pane.

For the electrical contacting of the flat electrodes, they are preferably connected to so-called flat or foil conductors that extend out of the intermediate layer beyond the side edge of the composite pane. Flat conductors have a strip-like metallic layer as a conductive core that is typically surrounded, with the exception of the contact surfaces, by a polymeric insulating sheath. Optionally, so-called bus bars, for example, strips of an electrically conductive foil (for example, copper foil) or electrically conductive imprints are arranged on the flat electrodes, with the flat conductors or foil conductors connected to these bus bars.

The side edge of the functional element can be sealed, for example, by fusing the carrier layers or by a (preferably polymeric) tape. In this way, the active layer can be protected, in particular against components of the intermediate layer (in particular plasticizers) diffusing into the active layer, which can result in degradation of the functional element.

In a preferred embodiment, the functional element is a PDLC functional element (polymer dispersed liquid crystal). The active layer of a PDLC functional element contains liquid crystals that are incorporated into a polymer matrix. When no voltage is applied to the flat electrodes, the liquid crystals are aligned in a disorderly manner, resulting in strong scattering of the light passing through the active layer. When a voltage is applied to the flat electrodes, the liquid crystals align themselves in a common direction and the transmittance of light through the active layer is increased. However, other functional elements can also be used whose optical property variability is based on liquid crystals, for example, PNLC functional elements (polymer networked liquid crystal).

In another preferred embodiment, the functional element is an SPD functional element (suspended particle device). The active layer contains suspended particles, with the absorption of light by the active layer being variable by application of a voltage to the flat electrodes.

In another preferred embodiment, the active layer of the functional element is an electrochemically active layer. Such functional elements are known as electrochromic functional elements. The transmittance of visible light depends on the rate of ion storage in the active layer, with the ions provided, for example, by an ion storage layer between an active layer and a flat electrode. The transmittance can be influenced by the voltage applied to the flat electrodes, which causes a migration of the ions. Suitable functional layers contain, for example, at least tungsten oxide or vanadium oxide.

The adjustable functional elements mentioned and their mode of operation are known per se to the person skilled in the art such that a detailed description can be dispensed with here.

In an advantageous further development of the invention, the functional element can be divided into segments controllable independently of one another. For this purpose, at least one flat electrode is divided into regions electrically isolated from one another by at least one insulation line. The individual segments are connected independently of one another to the control unit, or connected in each case to their own control unit such that they can be controlled to separately. Thus, different regions of the functional element can be switched independently. The insulation lines are preferably introduced into the flat electrode by means of laser radiation and have, for example, a width of 5 µm to 500 µm, in particular 20 µm to 200 µm. The width of the segments, i.e., the distance between adjacent insulation lines can be suitably selected by the person skilled in the art in accordance with the requirements in the individual case. Already laminated multilayer films can still be segmented after the fact by laser ablation. Laser processing can produce a thin, visually inconspicuous insulation line without damaging the carrier film typically overlaying it. For example, with such a multilayer film, roof panels of a motor vehicle can be produced whose optical properties in the region of the driver and in the region of the backseat can be switched differently or with which a progression of optical properties, in particular the transmittance of visible light can be adjusted through a plurality of independently switchable regions. If the functional element forms an electrically controllable sun visor of a windshield, segments formed by essentially horizontal insulation lines can be used to adjust the height of the sun visor (more precisely: the height of the non-transparent or transparency-reduced or darkened region of the sun visor). Another exemplary possible application is the production of large-area glazings for an open-plan office, wherein the optical properties in the region of the different workstations can be switched independently of one another.

The thermoplastic intermediate layer serves to join the two panes, as is customary with composite panes. Typically, thermoplastic films are used and the intermediate layer is formed therefrom. In a preferred embodiment, the intermediate layer is formed from at least a first thermoplastic layer and a second thermoplastic layer, between which the functional element is arranged. The functional element is then joined to the outer pane via a region of the first thermoplastic layer and to the inner pane via a region of the second thermoplastic layer. Preferably, the thermoplastic layers project circumferentially beyond the functional element.

Where the thermoplastic layers are in direct contact with one another and are not separated from one another by the functional element, they can fuse during lamination such that the original layers are no longer recognizable and, instead, there is a homogeneous intermediate layer.

A thermoplastic layer can, for example, be formed by a single thermoplastic film. A thermoplastic layer can also be formed from sections of different thermoplastic films whose side edges are placed against one another.

In a preferred embodiment, the functional element, more precisely the side edges of the functional element, is circumferentially surrounded by a third thermoplastic layer. The third thermoplastic layer is implemented like a frame with a recess in which the functional element is inserted. The third thermoplastic layer can be formed by a thermoplastic film in which the recess had been cut out. Alternatively, the third thermoplastic layer can also be composed of a plurality of film sections around the functional element. The intermediate layer is then formed from a total of at least three thermoplastic layers arranged flat atop one another, wherein the middle layer has a recess in which the functional element is arranged. During production, the third thermoplastic layer is arranged between the first and second thermoplastic layer, with the side edges of all thermoplastic layers preferably situated congruently. The third thermoplastic layer preferably has roughly the same thickness as the functional element. This compensates for the local difference in thickness that is introduced by the locally limited functional element such that glass breakage during lamination can be avoided and an improved visual appearance is created.

The layers of the intermediate layer are preferably formed from the same material, but can, however, in principle, also be made of different materials. The layers or films of the intermediate layer are preferably based on polyvinyl butyral (PVB), ethylene vinyl acetate (EVA), or polyurethane (PU). This means that the layer or film contains predominantly said material (content greater than 50 wt.-%) and, additionally, optionally, other components, for example, plasticizers, stabilizers, UV or IR absorbers. The thickness of each thermoplastic layer is preferably from 0.2 mm to 2 mm, particularly preferably from 0.3 mm to 1 mm. For example, films with the standard thicknesses of 0.38 mm or 0.76 mm can be used.

The outer pane and the inner pane are preferably made of glass, particularly preferably of soda lime glass, as is customary for window panes. The panes can, however, also be made of other types of glass, for example, quartz glass, borosilicate glass, or aluminosilicate glass, or of rigid clear plastics, for example, polycarbonate or polymethyl methacrylate. The panes can be clear, or also tinted or colored. Depending on the application, limits can be set for the degree of 10 tinting or coloring: thus, sometimes a prescribed light transmittance must be guaranteed, for example, light transmittance of at least 70% in the primary through-vision region A per Regulation No. 43 of the Economic Commission for Europe of the United Nations (UN/ECE) (ECE-R43, "Uniform Provisions Concerning the Approval of Safety Glazing Materials and Their Installation on Vehicles").

The outer pane, the inner pane, and/or the intermediate layer can have other suitable coatings that are known per se, for example, anti-reflecting coatings, non-stick coatings, anti-scratch coatings, photocatalytic coatings, or solar shading coatings or low-E coatings.

The thickness of the outer pane and of the inner pane can vary widely and thus be adapted to the requirements in the individual case. The outer pane and the inner pane preferably have thicknesses from 0.5 mm to 5 mm, particularly preferably from 1 mm to 3 mm.

The invention also includes a method for producing a composite pane with electrically controllable optical properties, wherein
  (a) a thermoplastic intermediate layer and a functional element with electrically controllable optical properties are arranged between an outer pane and einer inner pane,
  (b) the outer pane and the inner pane are joined via the intermediate layer by lamination,
  (c) a securing element for reversibly securing a control unit is applied to a surface of the outer pane or of the inner pane facing away from the intermediate layer (3), and
  (d) an electrical or electronic control unit suitable for controlling the optical properties of the functional element is arranged in the securing element.

In a preferred embodiment, the outer pane, a first thermoplastic layer, the functional element, a second thermoplastic layer, and the inner pane are arranged one atop another in this order. During lamination, the intermediate layer with an embedded functional element is formed from the first thermoplastic layer and the second thermoplastic layer. The functional element is preferably positioned such that it does not extend all the way to one of the side edges of the layer stack. The functional element is thus advantageously embedded in the intermediate layer, without having contact with the surrounding atmosphere. In a particularly preferred embodiment, arranged between the first and the second thermoplastic layer is a frame-like third thermoplastic layer with a cutout surrounded in a frame-like manner, into which the functional element is inserted. The cutout is preferably matched in shape and size to the functional element such that the latter can be inserted into the cutout with the most precise fit possible. The third thermoplastic layer evens out the thickness of the functional element in the regions around the functional element such that a mechanically and visually improved composite pane is produced. As already described, the individual layers are formed by thermoplastic films. The films are preferably cut-to-size according to the contour of the composite pane. The panes and the thermoplastic films are arranged substantially congruently one atop another. The thermoplastic layers can also be composed of multiple film sections.

It is possible to arrange further thermoplastic layers between the outer pane and the inner pane, which then also become part of the intermediate layer.

The functional element is preferably provided as a multilayer film with two outer carrier films. With such a multilayer film, the flat electrodes and the active layer are typically arranged between the two carrier films. Here, "outer carrier film" means that the carrier films form the two surfaces of the multilayer film. The functional element can thus be provided as a laminated film that can be processed advantageously. The functional element is advantageously protected against damage, in particular, corrosion, by the carrier films. The multilayer film contains, in the order indicated, at least one carrier film, one flat electrode, one active layer, another flat electrode, and another carrier film. Typically, the carrier films have in each case an electrically conductive coating that faces the active layer and functions as a flat electrode. Preferred embodiments of the carrier films, the flat electrodes, and the active layer have already been described above.

Multilayer films with electrically controllable optical properties are commercially available. The functional element can be cut from such a multilayer film in the desired size and shape, for example, mechanically or by laser radiation.

For electrical contacting, electrical cables, in particular flat conductors, are connected to the flat electrodes and guided out of the layer stack via the side edge. The cables are, of course, connected prior to lamination of the windshield.

Any prints present, for example, opaque masking prints or printed bus bars for the electrical contacting of the functional element, are preferably applied by screen printing.

The lamination is preferably done under the action of heat, vacuum, and/or pressure. It is possible to use lamination methods known per se, for example, autoclave methods, vacuum bag methods, vacuum ring methods, calender methods, vacuum laminators, or combinations thereof.

In one embodiment of the method, electrical cables are connected directly on the control unit, via which the control unit is electrically conductively connected to the flat electrodes of the functional element. This can be done before or (preferably) after the control unit is mounted in the securing element. The connection of the cables is preferably in the form of a plug connection, wherein the cables are plugged into sockets on the control element (or, alternatively, the cables are designed with a coupling and are connected to the control unit by plugs).

In one embodiment of the method, electrical cables are directly connected to the securing element, likewise, preferably by a plug-in connection. The securing element has an electrical contact region, which is electrically conductively connected to the flat electrodes of the functional element by said cables. The securing element can have conductor tracks or internal cables to establish the electrical connection between the contact region and the connection socket or connection plug. However, it is not necessary to use a plug-in connection; the cables can also be connected to the securing element permanently and non-detachably. The control unit has a complementary contact region that is brought into contact automatically upon attachment of the control unit on the securing element as intended, as a result of which the control unit is electrically conductively connected to the flat electrodes of the functional element. Thus, upon attachment of the control unit, the electrical connection to the functional element is simultaneously established such that a wiring step can be dispensed with. This is advantageous in particular when the control unit has to be removed from the securing element for maintenance, repair, or replacement purposes.

The invention further includes the use of a composite pane according to the invention in buildings or in means of transport for travel on land, in the air, or on water. The composite pane is preferably used as a window pane, for example, as a window pane of buildings, of rooms inside buildings, or of vehicles. The composite pane is particularly preferably used as a windshield, roof panel, rear window, or side window of a vehicle, for example, a motor vehicle.

If the composite pane is a windshield, the functional element is preferably used as an electrically controllable sun visor that is arranged in an upper region of the windshield, whereas the greater part of the windshield is not provided with the functional element.

However, the functional element can be arranged in the entire through-vision area of the composite panes. In a typical embodiment, this through-vision region includes the entire composite pane minus a circumferential edge region that is provided with an opaque masking print on at least one of the surfaces of the panes or polymeric layers. Instead of a masking print, a circumferential edge region of the intermediate layer or at least one of its layers can also be opaquely tinted or colored. The functional element extends over the entire through-vision region, with its side edges arranged in the region of the opaque masking print and thus inconspicuous or not visible to the viewer. This design is particularly suitable for roof panels, rear window panes, and (rear) side windows.

The invention is explained in detail with reference to drawings and exemplary embodiments. The drawings are a schematic representation and are not to scale. The drawings in no way restrict the invention. They depict.

FIG. 1, FIG. 2, FIG. 3, and FIG. 4 depict in each case a detail of a composite pane according to the invention with electrically controllable optical properties. The composite pane is, by way of example, provided as a roof panel of a passenger car, the light transmittance of which can be controlled electrically. The composite pane comprises an outer pane 1 and an inner pane 2 that are joined to one another via an intermediate layer 3. The outer pane 1 and the inner pane 2 are made of soda lime glass, which can optionally be tinted. The outer pane 1 has, for example, a thickness of 2.1 mm; the inner pane 2, a thickness of 1.6 mm.

The intermediate layer 3 comprises a total of three thermoplastic layers 3a, 3b, 3c, formed in each case by a thermoplastic film made of PVB with a thickness of 0.38 mm. The first thermoplastic layer 3a is bonded to the outer pane 1; the second thermoplastic layer 3b, to the inner pane 2. The third thermoplastic layer 3c positioned therebetween has a cutout into which a functional element 4 with electrically controllable optical properties is inserted with a substantially precise fit, i.e., roughly flush on all sides. The third thermoplastic layer 3c thus forms, so to speak, a sort of passepartout or frame for the roughly 0.4-mm-thick functional element 4, which is thus encapsulated all around in thermoplastic material and is thus protected. The functional element 4 is, for example, a PDLC multilayer film, that can be switched from a clear, transparent state into a cloudy, non-transparent (diffuse) state. The functional element 4 is a multilayer film consisting of an active layer 5 between two flat electrodes 8, 9 and two carrier films 6, 7. The active layer 5 contains a polymer matrix with liquid crystals dispersed therein, which orient themselves as a function of the electrical voltage applied on the flat electrodes, as a result of which the optical properties can be regulated. The carrier films 6, 7 are made of PET and have a thickness of, for example, 0.125 mm. The carrier films 6, 7 are provided with a coating of ITO with a thickness of roughly 100 mm facing the active layer 5, which form the flat electrodes 8, 9. The flat electrodes 8, 9 are connected via bus bars (not shown) (formed, for example by a silver-containing screen print) to electrical cables that establish the connection to a control unit 11.

Figure 2:
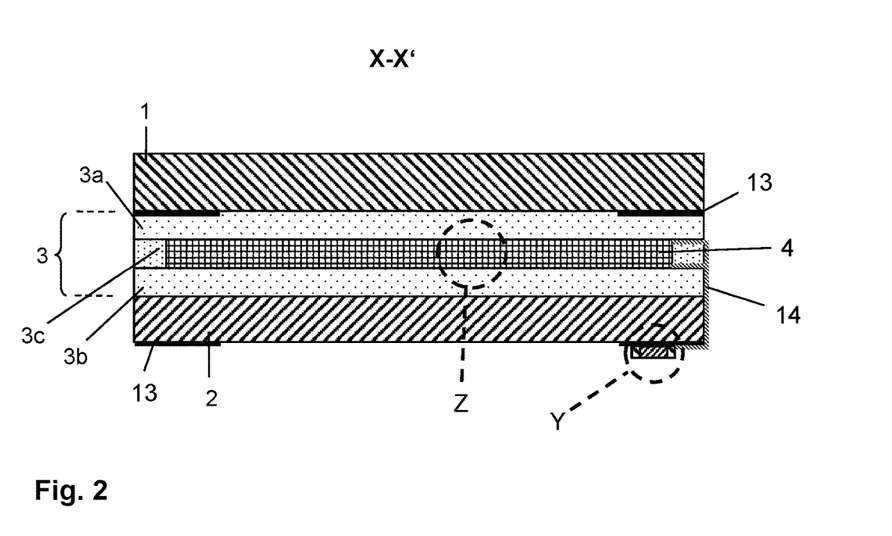
Figure 4:
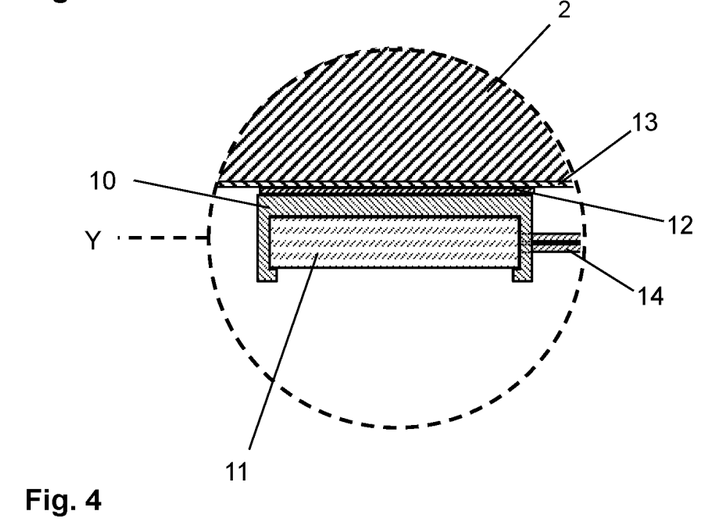

This control unit 11 is attached by a securing element 10 to the interior-side surface of the inner pane 2 facing away from the intermediate layer 3. The securing element 10 is made, for example, of polyamide and fastened on the composite pane via a layer of an adhesive 12. The securing element 10 comprises a plate that is attached surface-to-surface to the composite pane and a side wall in the edge region of the plate. The plate and the side wall enclose a cavity that has an opening facing away from the composite pane. The control unit 11 can be inserted through this opening into the cavity, as a result of which a reversible, i.e., detachable, connection to the securing element 10 is achieved. For this purpose, a region or a plurality of regions of the side wall ("latching lugs") extend beyond the surface of the control unit 11 facing away from the composite pane such that the control unit 11 latches in the securing element 10. During insertion and removal of the control unit 11, the flexible side wall (or a region thereof provided with the latching lugs) is bent slightly outward.

The electrical cables 14 are connected directly to the control unit 11 by means of a plug connection. On the other hand, the control unit 11 is connected to the onboard electrical system of the passenger car (not shown, for simplicity). The control unit 11 is suitable for applying, as a function of a switching signal specified by the driver, for example, by pressing a button, the voltage required for the desired optical state of the functional element 4, to the flat electrodes 8, 9 of the functional element 4.

Figure 1:
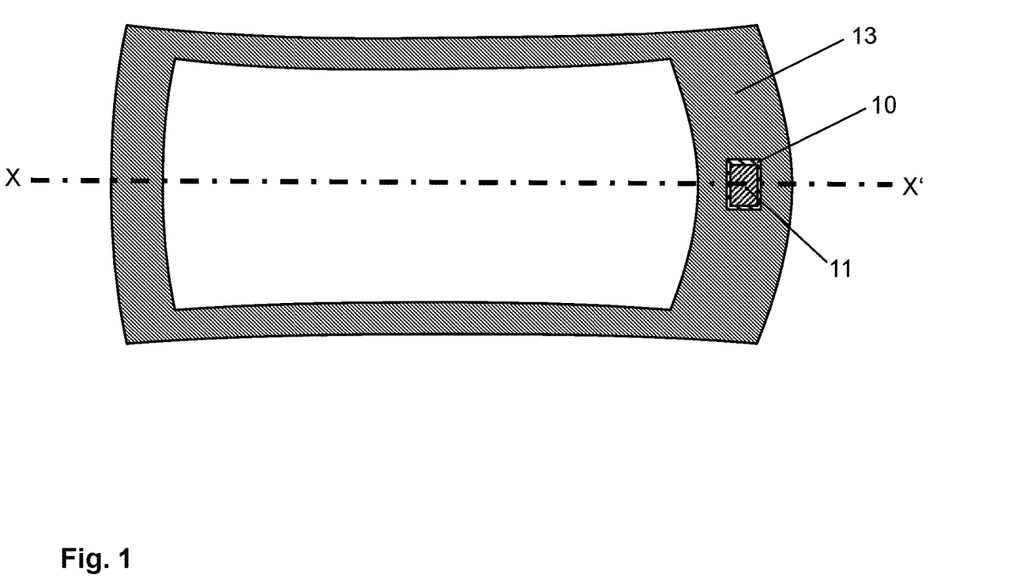
FIG. 1 a plan view of an embodiment of the composite pane according to the invention, FIG. 2 a cross-section through the composite pane of FIG. 1, FIG. 3 an enlarged representation of the region Z of FIG. 2, FIG. 4 an enlarged representation of the region Y of FIG. 2, FIG. 5 an enlarged representation of the region Y of FIG. 2 in an alternative embodiment, and FIG. 6 an exemplary embodiment of the method according to the invention with reference to a flow chart.
Figure 3:
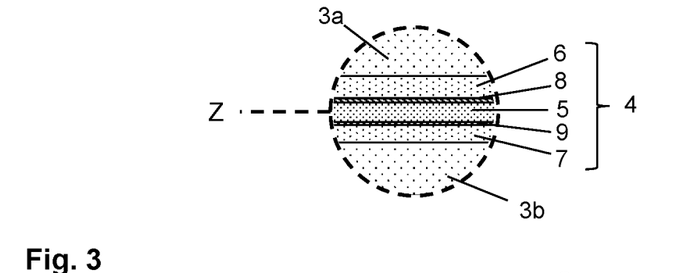

The composite pane has a circumferential edge region that is provided with an opaque masking print 13. This masking print 13 is typically made of a black enamel. It is screen-printed as a printing ink with a black pigment and glass frits and baked into the pane surface. The masking print 13 is, by way of example, applied on the interior-side surface of the outer pane 1 and also on the interior-side surface of the inner pane 2. The side edges of the functional element 4 are concealed by this masking print 13. The securing element 10 with the control unit 11 is arranged in this opaque edge region, i.e., bonded to the masking print 13 of the inner pane 2. There, the control unit 11 does not interfere with the through-vision through the composite pane and is visually inconspicuous. In addition, there is a short distance to the side edge of the composite pane such that, advantageously, only short cables 14 are required for the electrical connection of the functional element 14.

Figure 5:
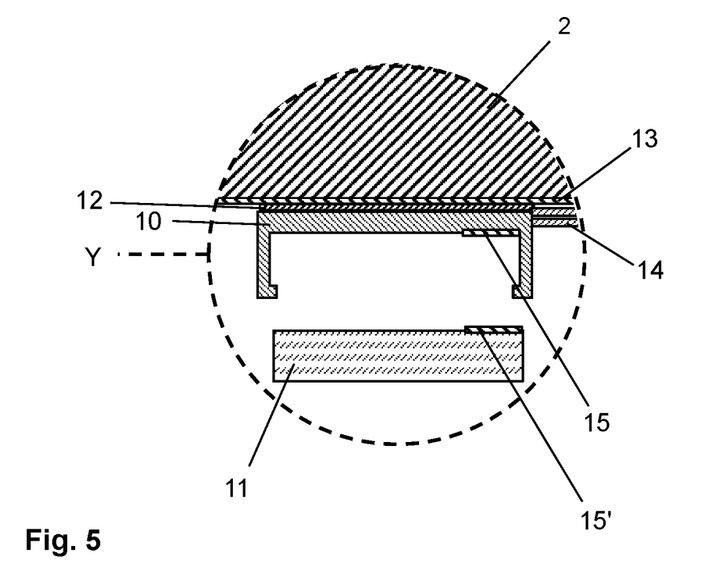

FIG. 5 depicts another embodiment of the securing element 10 and the control unit 11, which differs from the embodiment of FIG. 4. The cables 14 are connected to the securing element with a plug connection and electrically conductively connected to a contact region 15. The control unit 11, which in this case is situated outside the securing element 10, has a contact region 15' complementary thereto. The contact regions 15, 15' are positioned and formed such that they come into contact with each other when the control unit 11 is inserted into the securing element 10. The control unit 11 then does not have to be wired specifically.

Figure 6:
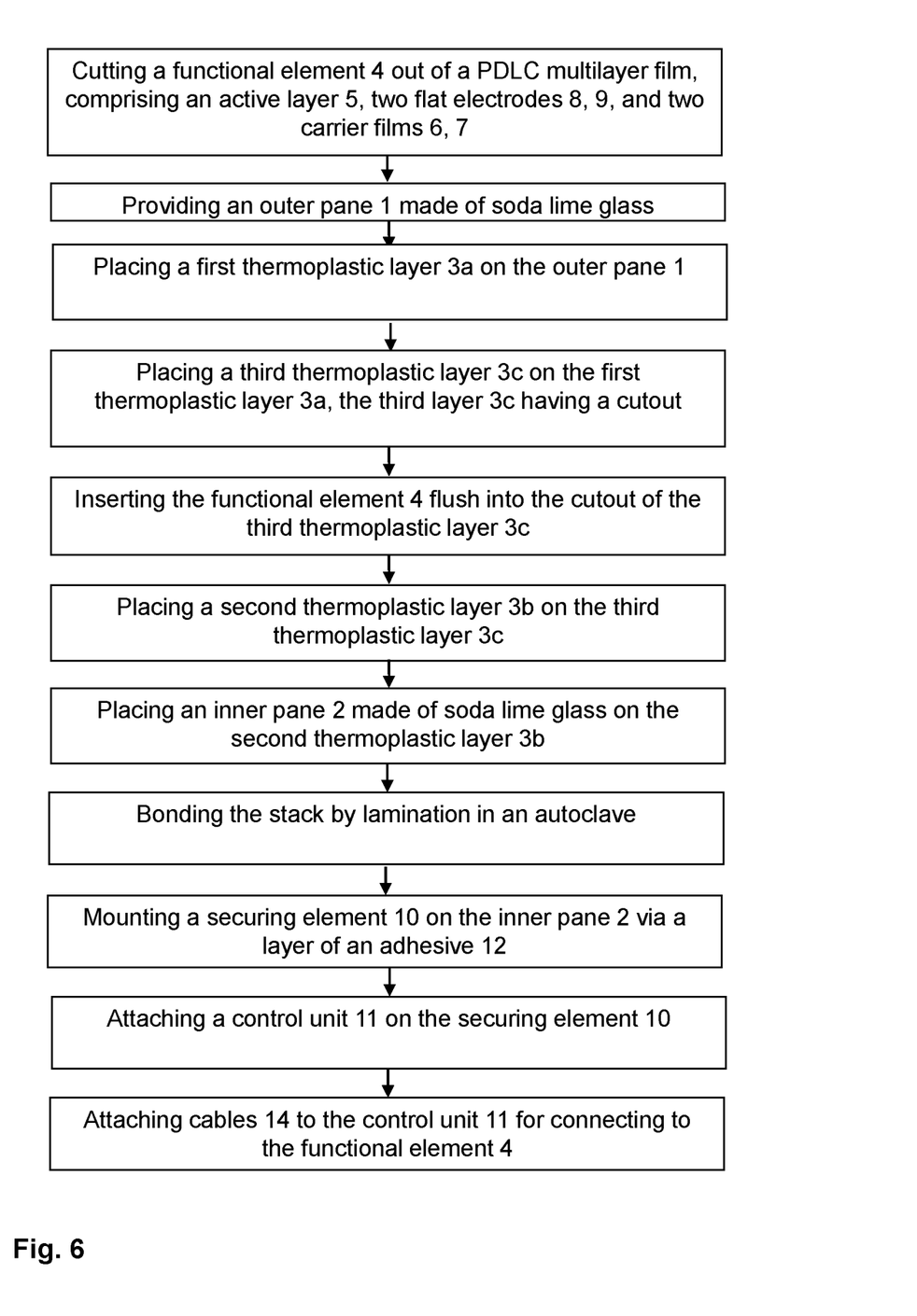

FIG. 6 depicts an exemplary embodiment of the production method according to the invention with reference to a flow chart.

LIST OF REFERENCE CHARACTERS (1) outer pane
(2) inner pane
(3) thermoplastic intermediate layer
(3a) first layer of the intermediate layer 3
(3b) second layer of the intermediate layer 3
(3c) third layer of the intermediate layer 3
(4) functional element with electrically adjustable optical properties
(5) active layer of the functional element 4
(6) first carrier film of the functional element 4
(7) second carrier film of the functional element 4
(8) flat electrode of the functional element 4
(9) flat electrode of the functional element 4
(10) securing element for reversibly securing a control unit
(11) control unit
(12) adhesive
(13) masking print
(14) electrical cables
(15) contact region of the securing element 10
(15') contact region of the control unit 11
X-X' section line
Y enlarged region
Z enlarged region

The invention claimed is:

1. A composite pane with electrically controllable optical properties, comprising an outer pane and an inner pane joined to one another via a thermoplastic intermediate layer,
    wherein a functional element with electrically controllable optical properties is integrated into the thermoplastic intermediate layer,
    wherein a securing element for reversibly securing a control unit is attached to a surface of the outer pane or of the inner pane facing away from the thermoplastic intermediate layer,
    wherein a control unit adapted to control the optical properties of the functional element is arranged in the securing element, and
    wherein the securing element is fixedly connected to the surface of the outer pane or of the inner pane and the control unit is detachably connected to the securing element such that, when the control unit is arranged in the securing element, the control unit and the functional element are electrically connectable to each other and, when the control unit is detached from the securing element, the control unit and the functional element are electrically disconnectable from each other.

2. The composite pane according to claim 1, wherein the securing element is secured to the surface via a layer of an adhesive.

3. The composite pane according to claim 1, wherein the securing element has a plate that is connected over its entire surface to the surface of the outer pane or of the inner pane and which is provided with latching means that interact with complementary parts of the control unit in a force-fitting or form-fitting manner and thereby fix the control unit on the securing element.

4. The composite pane according to claim 1, wherein the securing element has an electrical contact region that is electrically conductively connected to flat electrodes of the functional element via electrical cables, and wherein a complementary contact region of the control unit is in contact with the contact region of the securing element so that the control unit is electrically conductively connected to the flat electrodes.

5. The composite pane according to claim 1, wherein the securing element is made of plastic, of a metal or a metal alloy, or of ceramic.

6. The composite pane according to claim 1, wherein the functional element is a PDLC functional element, an SPD functional element, or an electrochromic functional element.

7. The composite pane according to claim 1, comprising an opaque masking print in a circumferential edge region of the composite pane, wherein the securing element is arranged in said edge region.

8. The composite pane according to claim 1, wherein the securing element is equipped with at least one sensor.

9. A method comprising providing a composite pane according to claim 1 as a window pane of a building, of a room inside the building, or of a vehicle.

10. The composite pane according to claim 8, wherein the at least one sensor is a light sensor and/or a temperature sensor.

11. The method according to claim 9, wherein the window pane is a windshield, a roof panel, a rear window, or a side window.

12. The composite pane according to claim 3, wherein the plate is secured against the surface of the outer pane or of the inner pane and wherein the plate is arranged between the control unit and the surface of the outer pane or of the inner pane to space apart the control unit from the surface of the outer pane or of the inner pane.

13. The composite pane according to claim 12, wherein the plate is secured against the surface of the outer pane or of the inner pane via an adhesive.

14. The composite pane according to claim 12, wherein the securing element has a side wall extending from the plate, the side wall and the plate forming a cavity that has an opening facing away from the composite pane and delimited by the side wall for receiving the control unit.

15. The composite pane according to claim 12, wherein the latching means is in a form of a circumferential or interrupted side wall that extends from the plate.

16. The composite pane according to claim 1, wherein the functional element is electrically connected to a first contact region provided on a surface of the securing element, wherein a surface of the control unit includes a second contact region, and wherein the first and second contact regions come in contact with each other by latching the control unit to the securing element to enable the control unit to control the optical properties of the functional element.

17. A method for producing a composite pane with electrically controllable optical properties, comprising:
    a) arranging a thermoplastic intermediate layer and a functional element with electrically controllable optical properties between an outer pane and an inner pane,
    b) joining the outer pane and the inner pane via the thermoplastic intermediate layer by lamination,
    c) attaching a securing element for reversibly securing a control unit to a surface of the outer pane or of the inner pane facing away from the thermoplastic intermediate layer, and
    d) arranging a control unit adapted to control the optical properties of the functional element in the securing element,
        wherein the securing element is fixedly connected to the surface of the outer pane or of the inner pane and the control unit is detachably connected to the securing element, and
        wherein when the control unit is arranged in the securing element, the control unit and the functional element are electrically connectable to each other and, when the control unit is detached from the securing element, the control unit and the functional element are electrically disconnectable from each other.

18. The method according to claim 17, wherein before or after step (d), electrical cables, via which the control unit is electrically conductively connected to flat electrodes of the functional element, are connected to the control unit.

19. The method according to claim 17, wherein the securing element has an electrical contact region that is electrically conductively connected to flat electrodes of the functional element via electrical cables, and wherein, in step (d), a complementary contact region of the control unit is brought into contact with the contact region of the securing element so that the control unit is electrically conductively connected to flat electrode of the functional element.

* * * * *